United States Patent [19]

v.d. Nieuwelaar et al.

[11] Patent Number: 4,811,458

[45] Date of Patent: Mar. 14, 1989

[54] PLUCKING DEVICE

[75] Inventors: Josephus A. v.d. Nieuwelaar, Gemert; Petrus C. M. Janssen, Wilbertoord, both of Netherlands

[73] Assignee: Stork PMT B.V., Netherlands

[21] Appl. No.: 206,263

[22] Filed: Jun. 13, 1988

[30] Foreign Application Priority Data

Jun. 12, 1987 [NL] Netherlands ............ 8701377

[51] Int. Cl.⁴ ........................................... A22C 21/02
[52] U.S. Cl. .............................................. 17/11.1 R
[58] Field of Search ............... 17/11.1 R, 47, 12, 48

[56] References Cited

U.S. PATENT DOCUMENTS

| | | | |
|---|---|---|---|
| 1,737,225 | 11/1929 | Dunner | 17/11.1 R |
| 1,737,226 | 11/1929 | Dunner | 17/11.1 R |
| 1,809,891 | 6/1931 | Dunner | |
| 2,313,770 | 3/1943 | Ringrose | |
| 4,570,293 | 2/1986 | Harben, Jr. et al. | 17/11 |

FOREIGN PATENT DOCUMENTS

| | | | |
|---|---|---|---|
| 1119594 | 6/1956 | France | |
| 2342665 | 9/1977 | France | |
| 751880 | 7/1956 | United Kingdom | 17/11.1 R |

*Primary Examiner*—Willie G. Abercrombie
*Attorney, Agent, or Firm*—Ostrolenk, Faber, Gerb & Soffen

[57] ABSTRACT

Plucking device with two elongated, cylindrical, plucking elements positioned at some distance from each other, to be rotated in opposite directions and mounted along a conveyor track for slaughtered poultry said elements being provided with helical toothing with such a pitch, that with a suitable chosen rotational speed of the elements, the poultry is driven by the elements in the longitudinal direction of the conveyor track.

9 Claims, 6 Drawing Sheets

PLUCKING DEVICE

BACKGROUND OF THE INVENTION

The invention relates to a device for the plucking of slaughtered poultry, comprising two elongated, cylindrical, plucking elements with surface irregularities which are positioned at some distance from each other and can be driven rotatingly in mutually opposite directions and which are mounted along a conveyor track for slaughtered poultry which is being transported hanging thereon by the legs.

DESCRIPTION OF THE PRIOR ART

Such a device is known in practice. This known device comprises two cylindrical elements which are supported by tilting arms by means of which the elements can be moved towards and away from each other; a serrated protection guard is mounted in front of each element. This device is destined in particular for the removal of the tail quills of the poultry hanging on and transported along the conveyor track. Periodically, when one or more of the poultry are close to the elements, the elements are brought towards each other by means of a suitable—hydraulic—drive, whereby the elements are forcefully pushed together and the tail quills between the elements are seized by the irregular surfaces thereof and pulled out.

This known device has a great number of disadvantages. In the first place it is, as a consequence of the shape of the surface of the elements, necessary that these elements are pushed together with great force in order to obtain a sufficiently secure grip on the tail quills, but a more serious objection is that the total package of tail quills is pulled out of the bird forcefully in one single stroke. The chance of damaging the carcass therefore is great, as is also the chance that not all tail quills are removed. As a consequence of the periodical operation is it not guaranteed that of all poultry, which pass the device, the tail quills are removed with certainty, while further the necessary motion of the elements with respect of each other results into a constructive complication.

The known device requires a permanent supervision; a supervisor must be present to insert manually the not correctly fed-in feathers. Furthermore the infeed, respectively the insertion of the feathers is relatively time-consuming, so that the device can only be used in combination with slowly moving conveyor tracks.

Furthermore the British Patent Specification 2 173 790 describes a device for the removal of the feathers of slaughtered poultry, comprising a housing to be held with one hand in which a drive motor is mounted and two cylindrical plucking elements, counter-rotatingly driven by this motor, the outer surfaces of which are provided with surface irregularities. With this device—in fact a handmixer provided with a plucking attachment piece—the poultry is treated one by one at the time. Such a device cannot be used in combination with an installation for treating as economically as possible great numbers of slaughtered poultry.

SUMMARY OF THE INVENTION

The invention aims to obviate these drawbacks and according to the invention this aim is achieved in that at least over a part of the length of both cooperating elements the surface irregularities are formed by helical toothing cooperating over at least a part of the length of the elements and having such a pitch, that with a suitable chosen rotational speed of the elements, the poultry is driven by the elements in the longitudinal direction of the conveyor track.

In the device according to the invention, the abrupt and often uncontrolled action of the known device is substituted by a smoothly proceeding operation: the feathers arriving at the infeed-end of the device are not gripped as a total package at the passing of the poultry, but are successively seized between the toothing of the cooperating elements and are successively pulled out of the carcass. It is clear that the chances of damage are thereby considerably smaller and it is also clear that the concept of the invention is extremely well suited to be applied to the proposed device not exclusively for the removal of the tail quills but also for the removal of the feathers from other parts of the carcass, and in particular from the wingtips. In fact it is possible to remove a great part of the plumage or even the complete plumage of slaughtered poultry with a number of devices as proposed by the invention. The device has a large capacity and is suitable to be used in combination with fast moving conveyor tracks.

Another important aspect of the device according to the invention is that its operation is so effective and secure that the presently generally customary scalding can be largely eliminated, certainly with regard to the removal of the tail- and wingfeathers whereby the plucking process can be executed in such a fashion that firstly the most difficult cult to remove, large, feathers are removed with the proposed device, thereafter a limited scalding process is used and afterwards the remainder of the smaller feathers is removed with the customary pluck device.

In a preferred embodiment a screening plate is mounted in front of each plucking element, while furthermore preferably centerlines of the elements are converging in the direction of transport, the converging angle being preferably selected at such a value that the distance of the elements at the intake end corresponds with the diameter of the shaft of the feathers to be removed.

In a preferred embodiment the rotational speed of the elements is synchronized with the transport speed of the conveyor track, while an advantageous pitch angle is approximately 45°.

At least two pairs of elements can be mounted at a distance above each other, while also the pairs of elements are mounted next to each other in the direction of transport.

The invention also relates to an installation for the plucking of slaughtered poultry which is transported along a conveyor track hanging on its legs, comprising one or more devices as described above, followed in the direction of transport by a known plucking device, with plucking discs and/or plucking drums.

DESCRIPTION OF A PREFERRED EMBODIMENT

Figure 1:
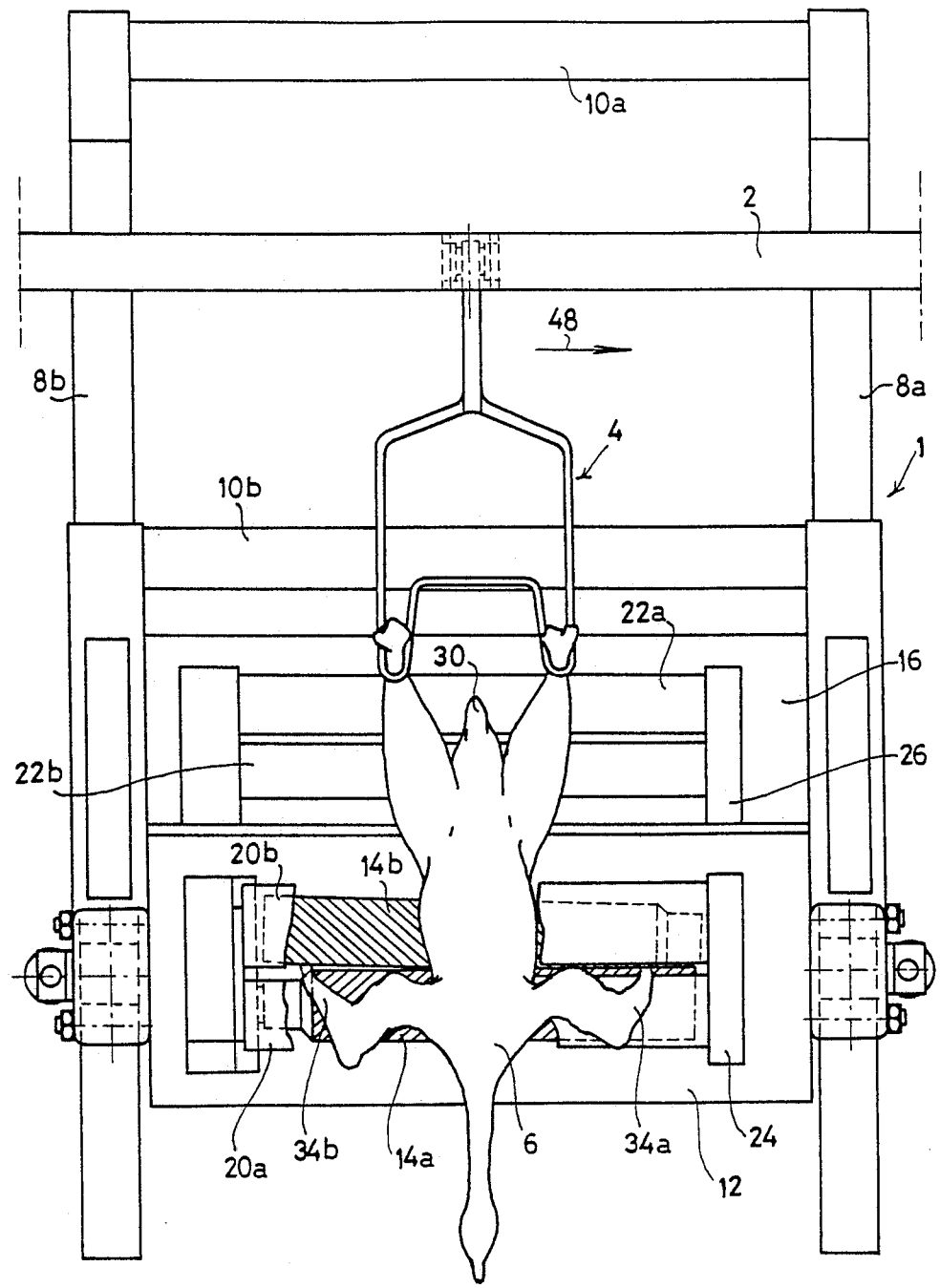
FIG. 1 is a front view of an embodiment according to the invention.

The device depicted in FIG. 1 comprises a frame 1 which is mounted alongside a conveyor track 2 along which the poultry to be treated is transported hanging on the customary transporthook 4; such a fowl is indicated with the reference numeral 6.

The frame comprises two vertical posts 8a, 8b interconnected by a number of horizontal girders, of which two are indicated with the reference numerals 10a, 10b. In the frame cylindrical plucking elements are pairwise combined with each other; each pair is taken up in a separate plucking unit which is supported in the frame 1. The Figures show two of such plucking units: the lower plucking unit 12 with the cylindrical plucking elements 14a, 14b and the upper plucking unit 16 with the plucking elements 18a, 18b. A curved protection plate is mounted in front of each plucking element; for the plucking unit 12 these are the partly cut-away drawn protection plates 20a, 20b and for the plucking unit 16 the protection plates 22a, 22b. The plucking elements are rotatably driven in mutually opposite direction; this drive can be realized in any suitable, otherwise generally known, manner (e.g. by means of intermeshing gearwheels or by means of a geared belt) and for the sake of clarity these drives, fitted in the drive casing 24 for the unit 12 and the drive casing 26 for the unit 16, are not shown in detail.

Figure 3:
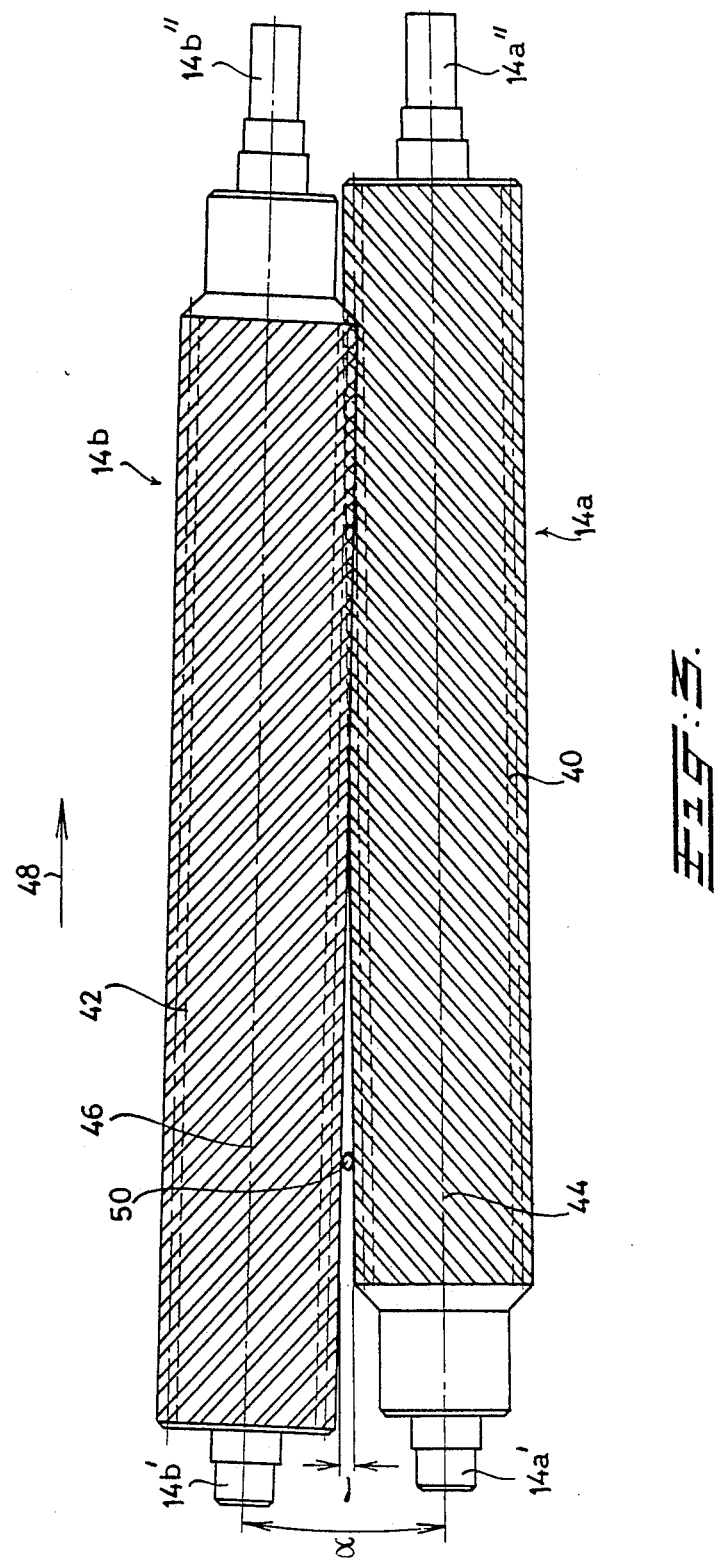
FIG. 3 shows the mutual orientation of the cylindrical elements used in this embodiment.

The Figures show a device which is in particular destined for the removal of the tail quills 28 at the tail of the fowl 6 and the long wing quills 32 at the ends of the wings 34a, 34b. The first mentioned are removed with the unit 16 and the latter mentioned with the unit 12. FIG. 3 shows at a larger scale a pair of plucking elements 14a, 14b. The left-hand shaftstub 14a' of the element 14a is mounted in a suitable bearing, which is not shown, as well as the left-hand shaftstub 14b' of the element 14b; the right-hand shaftstub 14a" of the element 14a is arranged to be fitted with a, also not shown, drive gearwheel as well as the right-hand shaftstub 14b". For the sake of clarity these details heave been omitted.

Figure 4:
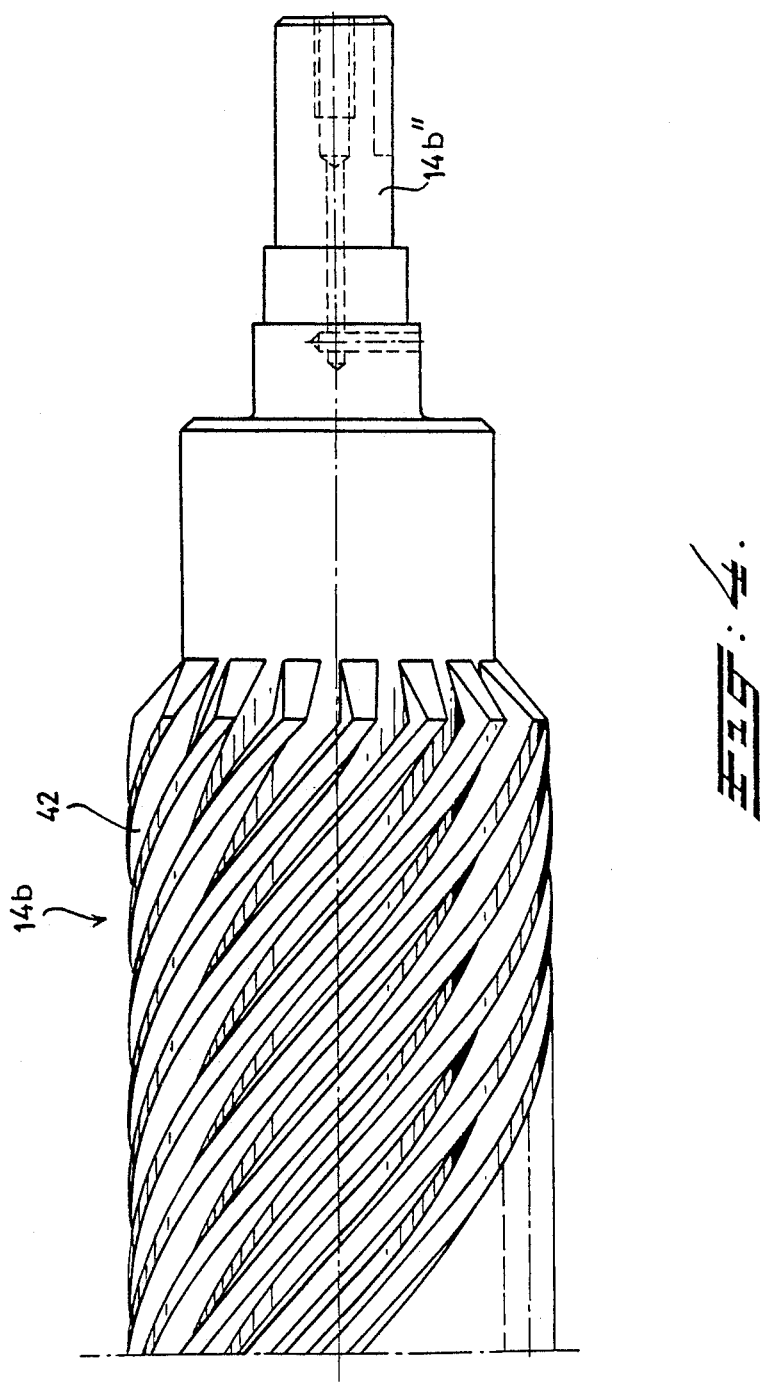
FIG. 4 shows more in detail a part of such a cylindrical element.

As is shown in FIG. 3 both the cylindrical elements 14a, 14b are provided with a wormgear toothing on the surface, i.e. The toothing 40 for the element 14a and the toothing 42 for the element 40b. FIG. 4 shows a part of this toothing in detail and FIG. 5 shows a cross-section over a part of the elements 14a, 14b at a location where the toothings of the elements are intermeshing.

FIG. 3 shows how the centerlines 44 of the element 14a respectively 46 of the element 14b are mutually not parallel, but are converging in the direction of transport of the poultry, as indicated with the arrow 48.

The arrangement of the elements 14a, 14b is such that, as seen in the direction of transport, an "infeedend" is formed (on the left-hand side in FIG. 3) where the toothings are not intermeshing. The angle α which is enclosed by the centerlines 44 and 46, and therewith the distance 1 between the outer encirclements 40a, 42a of the toothings 40 respectively 42 (see FIG. 5) is in practice dependent upon the thickness of the quills that are to be removed with the device and therefore upon the type of the fowl to be treated. This distance 1 can vary between some millimeters and 10 millimeters.

Figure 5:
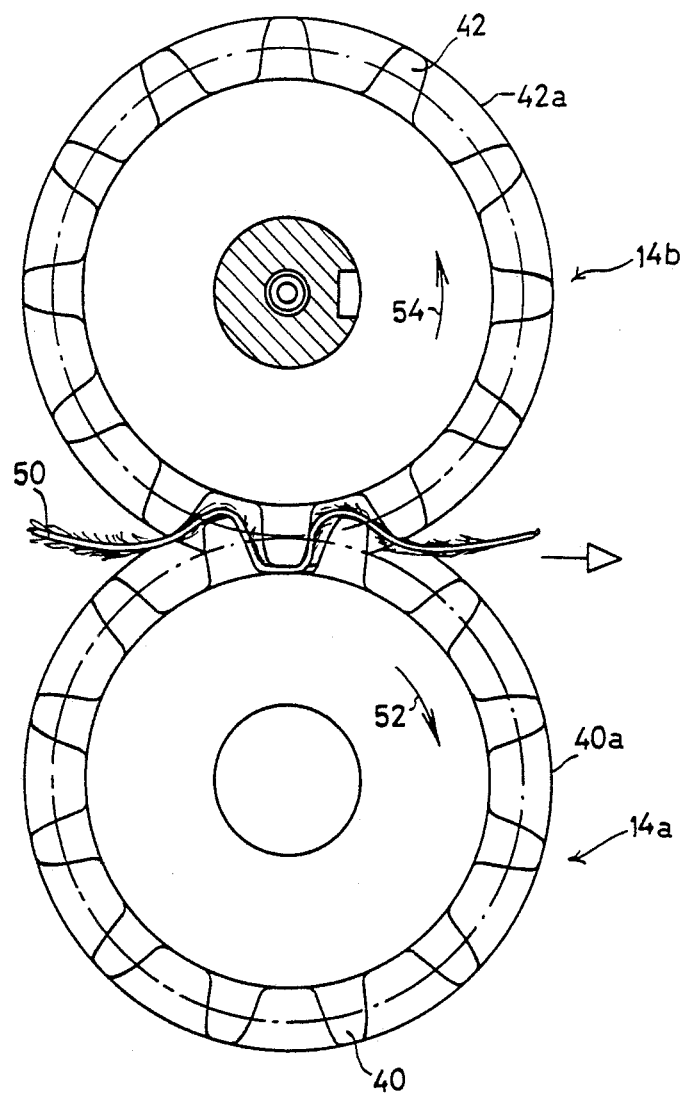
FIG. 5 clarifies the interaction of the surface toothing on these cylindrical elements.

FIG. 5 clarifies the effect which is obtained with the device according to the invention. Featherquills, such as the quill 50 of the poultry transported along the plucking elements 14a, 14b, will, after entering between these elements in the manner as shown in FIG. 5, be seized on the one side between the toothing 40 of the element 14a, rotating in the direction of arrow 52, and on the other side the toothing 42 of the element 14b, rotating in the direction of arrow 54; the quill is thus firmly seized and—what is important—is gradually pulled out of the poultry 6.

Figure 2:
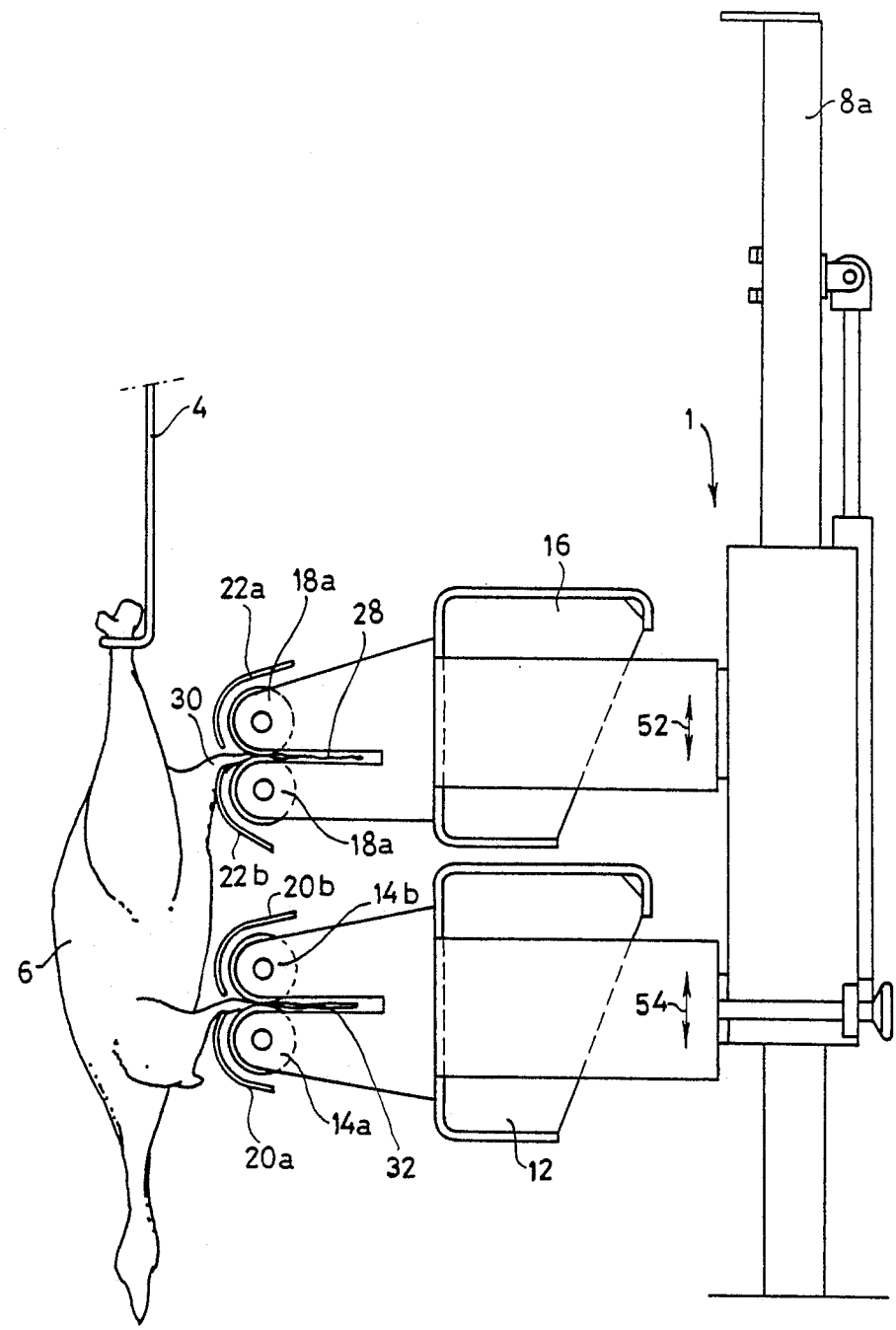
FIG. 2 is a side view of this embodiment.

Within the scope of the invention many variations are possible. Thus the attachment of the units 12 and 14 in the frame 1 can be made in such a manner, that these can be displaced in the vertical direction, i.e. in the direction of the arrows 52, 54 in FIG. 2, as is known for plucking devices. Also many variants are possible in the arrangement of the plucking units.

Figure 6:
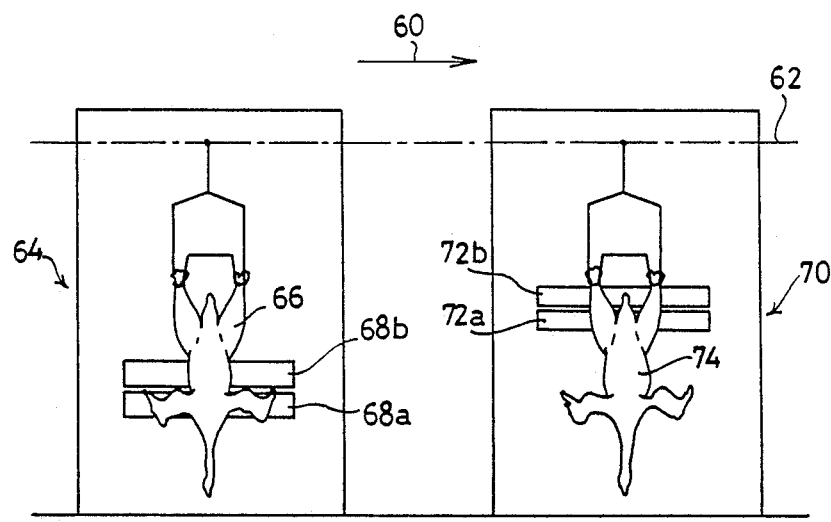
FIG. 6 shows two devices in series for removing wing quills and tail quills, respectively.

Thus FIG. 6 shows an arrangement with two devices according to the invention, mounted behind each other in the transport direction 60 of the conveyor track 62, indicated with a dash-dot line. In the first device 64 the poultry 66 is disposed of the wing quills, which are removed by the pair of plucking elements 68a, 68b while in the successive device 70 the tail quills of the poultry 74 are removed by the plucking elements 72a, 72b.

When with a device according to the invention the—difficult removable—tail and wing quills are removed, the poultry only needs to be scalded for a short time, when for the removal of the remaining feathers the classical plucking device with e.g. plucking discs is used.

Figure 7:
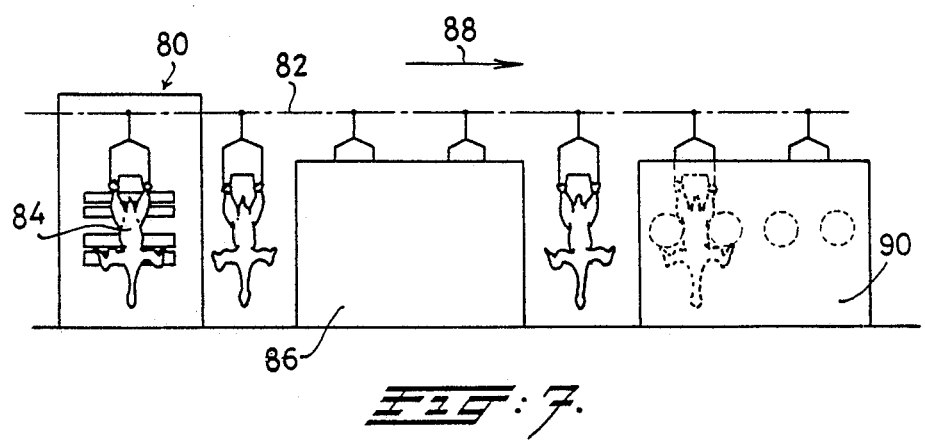
FIG. 7 shows a schematic of a quill remover, a scalder and a plucker in series.

FIG. 7 shows an arrangement with a device 80 according to the invention, corresponding with the one that has been described above, and in which the fowl 84, hanging on the conveyor track 82 is disposed of the tail and wing quills. In the successive, schematically indicated, scalding device 86, which can be of the otherwise generally known type, the poultry only needs to be scalded for a short period to ensure that the remaining plumage is completely removed by the plucking device 90 with plucking discs according to the prior art, which follows as seen in the transport direction 88, the device 86. Naturally the fact that only a short period of scalding is necessary, leads to an improvement of the quality of the product.

What is claimed is:

1. Device for the plucking of slaughtered poultry, comprising two elongated, cylindrical, plucking elements with surface irregularities which are positioned at some distance from each other and can be driven rotatingly in mutually opposite directions and which are mounted along a conveyor track for slaughtered poultry which is being transported hanging thereon by the legs, in which at least over a part of the length of both cooperating elements the surface irregularities are formed by helical toothing cooperating over at least a part of the length of the elements and having such a pitch, that with a suitable chosen rotational speed of the elements, the poultry is driven by the elements in the longitudinal direction of the conveyor track.

2. Device according to claim 1, a screening plate being mounted in front of each plucking element.

3. Device according to claim 1, in which the centerlines of the elements are converging in the direction of transport.

4. Device according to claim 3, in which the converging angle has been selected at such a value that the distance of the elements at the intake end corresponds with the diameter of the shaft of the feathers to be removed.

5. Device according to claim 1, in which the rotational speed of the elements is synchronized with the transport speed of the conveyor track.

6. Device according to claim 1, in which the pitch angle is approximately 45°.

7. Device according to claim 1, at least two pairs of elements being mounted at a distance above each other.

8. Device according to claim 1, the pairs of elements being mounted next to each other in the direction of transport.

9. Installation for the plucking of slaughtered poultry which is transported along a conveyor track hanging on its legs, comprising at least one device according to claim 1, followed in the direction of transport by a known plucking device, as known per se.

* * * * *